United States Patent
Irmscher et al.

[15] 3,684,800
[45] Aug. 15, 1972

[54] DI-EPOXIDE PROCESS FOR THE PREPARATION OF 9α-FLUORO-16-METHYLENE-PREDNISOLONE OR -PREDNISONE, AND 21-ESTERS THEREOF

[72] Inventors: Klaus Irmscher; Dieter Orth, both of Darmstadt, Germany

[73] Assignee: E. Merck Aktiengesellschaft, Darmstadt, Germany

[22] Filed: Aug. 21, 1969

[21] Appl. No.: 847,578

[30] Foreign Application Priority Data

Aug. 31, 1968 Germany..........P 17 93 318.5

[52] U.S. Cl..........................260/239.55, 260/397.45
[51] Int. Cl..............................................C07c 173/00
[58] Field of Search ......./Machine Searched Steroids

[56] References Cited

UNITED STATES PATENTS 3,321,496  5/1967  Taub et al.............260/397.45
3,376,294  4/1968  Agnello et al. .......260/239.55
3,396,161  8/1968  Irmscher et al.......260/239.55

Primary Examiner—Elbert L. Roberts
Attorney—William I. Millen

[57] ABSTRACT

In the preparation of 9α-fluoro-16-methylene-prednisolone or -prednisone and 21-esters thereof, 9β, 11β; 16α, 17α-diepoxy-16β-methylprogesterone is reacted, in any desired sequence, with hydrogen fluoride and with a microbiological 1(2)-dehydrogenation agent, to produce 9α-fluoro-16-methylene-1,4-pregnadiene-11β,17α-diol-3,20-dione. The resultant compound is then subjected to acetoxylation at the 21-position. Thereafter, 9α-fluoro-16-methyleneprednisolone-21-acetate is optionally converted to corresponding prednisone by treatment with an oxidizing agent, and/or the 21-acetoxy-group is saponified to form the corresponding 9α-fluoro-16-methyleneprednisolone or -prednisone, and/or the free 21-OH groups are esterified.

The 9β, 11β; 16α, 17α-diepoxy-16β-methyl-progesterone starting material is prepared by subjecting 16β-methyl-16α,17α-epoxyprogesterone to the successive steps of 11-hydroxylation, dehydration, chemical addition of hypohalous acid and dehydrohalogenation, with special pH conditions maintained during the dehydration step to avoid epoxide cleavage.

1 Claim, No Drawings

DI-EPOXIDE PROCESS FOR THE PREPARATION OF 9α-FLUORO-16-METHYLENE-PREDNISOLONE OR-PREDNISONE, AND 21-ESTERS THEREOF

BACKGROUND OF THE INVENTION

The invention relates to an improved process for the preparation of 9α-fluoro-16-methylene steroids, especially those of the formula

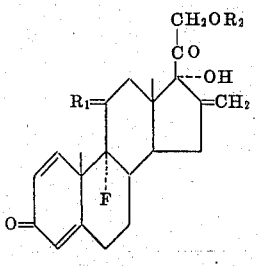

wherein
$R_1$ represents αH, βOH or =O, and
$R_2$ is H or an ester group.

It has been disclosed that these compounds can be produced, by 11-hydroxylation and a number of following reactions, in accordance with German Pats. No. 1,130,805; 1,156,804; and 1,263,765, from 16-methylene-17α-hydroxy-progesterone, the latter being obtainable from 16β-methyl-16α, 17α-epoxyprogesterone (I) by cleavage of the epoxide ring. A particularly advantageous method consists in first converting (I), by successive 11-hydroxylation, dehydration (by way of the tosylate), chemical addition of hypohalous acid, and dehydrohalogenation, into 9β,11β-epoxy-16-methylene-17α-hydroxyprogesterone (II); the 17-OH group is advantageously blocked by acetylation after the dehydration, and liberated again after the dehydrohalogenation has been conducted. Compound (II) is then acetoxylated in the 21-position to obtain 9β,11β-epoxy-16-methylene-4-pregnene-17α,21-diol-3,20-dione-21-acetate; the latter is reacted with hydrogen fluoride to form 9α-fluoro-16-methylenehydrocortisone-21-acetate, saponified, and dehydrogenated microbiologically in the 1(2)-position to 9α-fluoro-16-methyleneprednisolone. Optionally, the last mentioned compound is oxidized to the corresponding prednisone derivative and/or esterified in the 21-position, for example acetylated to the particularly valuable 9α-fluoro-16-methyleneprednisolone-21-acetate(III). In this way, compound (III) can be obtained from (I) in a total of 13 steps, with an overall yield of 3.3 percent.

In view of the rather large number of steps and low overall yield in the production of 9α-fluoro-16-methylene-prednisolone-21-acetate (III), by prior art processes, it is a principal object of this invention to provide an improved process having fewer steps and a higher yield.

A further object is to provide novel processes for obtaining intermediates in the production of (III).

Upon further study of the specification and claims, other objects and advantages of the present invention will become apparent. To achieve the above objects, it has now been discovered that compound (III) can be obtained in only 8 stages from (I), with a total yield which is four times as high (14 percent) by conducting the first part of the above-described reaction sequence (11-hydroxylation, dehydration, chemical addition of hypohalous acid and dehydrohalogenation) without splitting the 16α, 17α-epoxide ring of compound (I). In this procedure, the 16α, 17α-epoxide ring can be kept surprisingly intact, if careful control of the pH of the reaction medium is maintained so that it does not decrease below weakly acidic lower limit during the elimination of the sulfonic acid. Thereafter, the chemical addition of hypohalous acid can be readily accomplished in a strongly acidic medium, but again without the epoxide ring being attacked in the 16,17-position. During the subsequent reaction wherein the thus-obtained 9β,11β; 16α, 17α- di-epoxide, or the 1(2)-dehydro-derivative thereof, is reacted with hydrogen fluoride, each of the two epoxide rings is quite unexpectedly split in the desired direction, thereby resulting in 9α-fluoro-11β, 17α-dihydroxy-16-methyleneprogesterone or the 1(2)-dehydro-derivative thereof. The last-mentioned compound is converted into (III) by 21-acetoxylation. From the acetate(III), it is further possible to obtain, by oxidation and/or saponification, 9α-fluoro-16-methyleneprednisone-21-acetate or the corresponding 21-OH-compounds and, by esterification thereof, the corresponding 21-esters.

Thus, it can be considered that a process of the invention for the preparation of 9α-fluoro-16-methyleneprednisolone or -prednisone and 21-esters thereof, is based on the key step of reacting hydrogen fluoride with 9β, 11β; 16α, 17α-diepoxy-16β-methyl-progesterone or the 1(2)-dehydro derivative thereof. If the former compound is used, then the product is reacted with a microbiological 1(2)-dehydrogenating agent. Thereafter, the thus-obtained 9α-fluoro-16-methylene-1,4-pregnadiene-11β, 17α-diol-3,20-dione is treated in an alkaline solution with iodine and subsequently with an alkali metal acetate. In the thus-produced 9α-fluoro-16-methyleneprednisolone-21-acetate, the 11-OH-group is optionally converted into an 11-keto-group by treatment with an oxidizing agent and/or the 21-acetoxy-group is optionally saponified by treatment with a saponification agent with the formation of 9α-fluoro-16-methylene-prednisolone or - prednisone and then these compounds can be converted into the 21-esters thereof by treatment with an esterification agent.

Furthermore, it was found that 9β,11β;16α,17α-diepoxy-16β-methyl-steroids (which may carry one further substituent at the 16β-methyl-group) in general can be split with HF to yield 9α-fluoro-11β,17α-dihydroxy-16-methylene steroids (which may be substituted at the 16-methylene group by one additional substituent). Particularly, steroids of the pregnane series can be thus obtained. More particularly, 9β11β;16α,17α-diepoxy-16β-methyl-progesterone derivatives of the following general formula A can be used as starting materials:

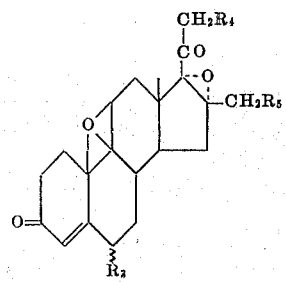

wherein
- $R_3$ is H, F, Cl, Br or $CH_3$,
- $R_4$ is H or $OR_2$,
- $R_5$ is H or F, and
- $R_2$ is as defined above and the 1(2)-dehydro, 6(7)-dehydro and 1(2), 6(7)-bis-dehydro derivatives thereof.

Corresponding final products are those of the following general formula B:

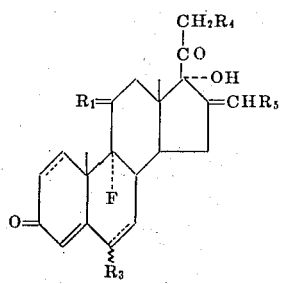

wherein $R_1$, $R_3$, $R_4$ and $R_5$ are as defined above and the 1(2)-dehydro, 6(7)-dehydro and 1(2), 6(7)-bis-dehydroderivatives thereof.

DETAILED DISCUSSION OF THE INVENTION

The conversion of 16β-methyl-16α, 17α-epoxyprogesterone to 9β, 11β; 16α, 17α-diepoxy-16β-methyl-progesterone, is accomplished in the following manner:

To introduce the 11α-hydroxyl-group into the 16β-methyl-16α, 17α-epoxyprogesterone, species of the following genera of microorganisms are suitable, for example: Absidia, Aspergillus, Bacillus, Beauveria, Cephalothecium, Cercospora, Corticium, Coryneum, Cunninghamella, Dactylium, Delacroixia, Eurotium, Fusarium, Gloeosporium,Glomerella, Helicostylum, Helminthosporium, Metarrhizium, Mucor (and other genera of the order Mucorales), Neurospora, Penicillium, Pestalotia, Phoma, Rhizopus, sporotrichum,Tieghemella, Trichoderma, Trichothecium. The fermentation is conducted in accordance with the conventional methods and requires about 10—48 hours, depending upon which microorganism is being employed. Preferred micro-organisms are the species of Aspergillus sp. (E. Merck Collection Line [strain, culture] No. 2314), and *Metarrhizium anisopliae*. The resultant 11-hydroxy-steroid is extracted from the reaction mixture in the usual manner by means of chloroform or methylene chloride, for example.

For dehydrating purposes, the thus-obtained 11α-hydroxy-16β-methyl-16α, 17α-epoxyprogesterone is first converted into a suitable lower alkyl- or arylsulfonic acid ester in the conventional manner. Preferred sulfonic acid esters are p-toluenesulfonate, as well as benzene- and methanesulfonate. The esterification is accomplished by reacting with the corresponding sulfonyl chloride, e.g., p-toluenesulfonyl chloride, benzenesulfonyl chloride or methanesulfonyl chloride, in the presence of a base, such as pyridine or collidine.

The thus-obtained sulfonic acid ester is subsequently treated with a weak base in an inert solvent, and during this process, the sulfonic acid on which the sulfonic ester is based, is split off, with the formation of a 9(11)-double bond. In this connection, the pH of the solution must be controlled so that it does not drop to that pH range at which the epoxide ring is cleaved. This critical pH range is below about 6; so preferably the pH of the solution is maintained at about 6 to 12, preferably 6.5 to 9.

Conversely, in this connection it is important to note that in the conventional methods of tosylate split-off processes with alkali metal acetate in glacial acetic acid or with lithium chloride in dimethyl formamide, the reaction is usually conducted at a pH of about 0.5 to 3.

The pH of the cleaving step of this invention is adjusted by preferably treating the sulfonic acid ester with a weak base, such as sodium or potassium acetate, pyridine or collidine, in an inert solvent, such as a lower alcohol of 1—4 carbon atoms, dimethyl acetamide, dimethyl formamide or dimethyl sulfoxide. Particularly preferred is the reaction with potassium acetate in ethanol. The splitting-off step takes place at temperatures of generally between room temperature and about 150° C., especially at the boiling temperature of the solvent employed, preferably between 60° and 120° C., and is terminated after about 1 hour up to 14 days, depending on the base and the reaction temperature employed. When operating in boiling ethanol or isopropanol, the reaction mixture must be boiled for about 24 hours in order to terminate the reaction.

Thereafter, hypochlorous or hypobromous acid is chemically added to the thus-obtained 9(11)-dehydro-16β-methyl-16α, 17α-epoxy-progesterone. The hypohalous acid is preferably produced in situ from N-chlorosuccinimide, N-bromosuccinimide, 1,3-dichloro- or 1,3-dibromo-5,5-dimethylhydantoin and small amounts of a mineral acid, such as sulfuric acid or perchloric acid. The solvent utilized is preferably a mixture of water and acetone, butanone or dioxane. The reaction usually occurs at a temperature between about 0° C. and room temperature, and for between 15 minutes and 6 hours. In spite of the strongly acidic reaction medium having a pH of about 0.5 to 3, preferably about 1 to 2, the epoxide ring is not attacked under these conditions.

The 9β, 11β; 16α, 17α-diepoxy-16β-methyl-progesterone is prepared by treating the chlorohydrin or bromohydrin with an agent capable of bringing about the liberation of hydrogen halide, such agent preferably being an alkali metal acetate, such as potassium acetate. The reaction is usually conducted in an inert solvent, preferably a lower alcohol of 1—4 carbon atoms, such as ethanol, at temperatures of between room temperature and 150° C., preferably at the boiling temperature.

To split the diepoxide, the reaction is conducted for a period of about 15 minutes to 6 hours with approximately 70 percent aqueous hydrofluoric acid at about −20° to −15° C. Under all these conditions, the 9β, 11β-epoxide ring is split with the formation of fluorohydrin, whereas the 16α, 17α-epoxide ring is cleaved with the formation of the 16-methylene-17α-hydroxy structure. This reaction was quite surprising, as, in accordance with the state of the art, the formation of a mixture with the 15(16)-dehydro-16-methyl- isomer was to be expected.

The resultant 9α-fluoro-11β, 17α-dihydroxy-16-methyleneprogesterone is thereafter dehydrogenated microbiologically in the 1(2)-position, particularly suitable microorganisms including, but not limited to the following genera: Acetobacter, Aerobacter, Alcaligenes, Alternaria, Arthrobacter, Azotobacter, Azotomonas, Bacillus (especially *Bacillus cyclooxydans* and *Bacillus sphaericus*), Calonectria (especially *Calonectria decora*), Colletotrichum, Corynebacterium, Cucurbitaria, Cylindrocarpon (especially *Cylindrocarpon radicicola*), Didymella (especially *Didymella lycopersici*), Erysipelothrix, Fusarium, Gliocladium, Gloeosporium, Helminthosporium, Leptospaerium, (Leptospira,) Listeria, Micromonospora, Mycobacterium, (especially *Mycobacterium lacticola* and *Mycobacterium smegmatis*), Nocardia, Ophiobolus, Protaminobacter, Pseudomonas, Pycnodothis, (Pyknodothis), Septomyxa (particularly *Septomyxa affinis*), Serratia, Stereum, Streptomyces (particularly *Streptomyces lavendulae*), Trichothecium and Vermicularia. The fermentation usually requires about 4—24 hours, depending upon the micro-organism employed. Especially preferred are cultures of *Bacillus sphaericus* var. *fusiformis* and *Corynebacterium simplex*.

It is also possible to reverse the order of steps of epoxide splitting and 1(2)-dehydrogenation. When dehydrogenation is conducted first, the 9$\alpha$-fluoro-11$\beta$, 17$\alpha$-dihydroxy-16-methylene-1,4pregnadiene-3,20-dione is obtained from the 1(2)-dehydro-derivative of the above-mentioned diepoxide.

To introduce the 21-acetoxy-group, this compound is treated with elemental iodine in an alkaline solution and then with an alkali acetate, e.g. potassium acetate. It is suitable to add the elemental iodine to a solution of the steroid in an inert organic solvent, for example a mixture of tetrahydrofuran and methanol. The reaction solution is subsequently mixed dropwise with an aqueous sodium hydroxide solution. The resultant 21-iodine compound is then reacted, preferably in situ, with potassium acetate into 9$\alpha$-fluoro-16-methyleneprednisolone-21-acetate (III).

The thus-produced compound (III) or the non-esterified 9$\alpha$-fluoro-16-methylene-prednisolone which can be prepared therefrom by saponification, can be oxidized to obtain the corresponding 11-keto-compounds. Advantageous oxidizing agents include, but are not limited to: a mixture of $CrO_3$ and pyridine, or a mixture of $CrO_3$ and $H_2SO_4$ in water/acetone (Jones reagent), or hypohalous (hypochlorous or hypobromous)acid. The resultant 11-keto-steroids can be isolated from the reaction mixture in a conventional manner, for example by extraction with an organic solvent or by precipitation with water.

It is possible to convert 9$\alpha$-fluoro-16-methyleneprednisolone- or -prednisone-21-acetate into 9$\alpha$-fluoro-16-methyleneprednisolone or -prednisone by treatment with a conventional saponification agent, for example, an aqueous solution of sodium bicarbonate, the reaction being preferably conducted in an atmosphere devoid of oxygen.

Conversely, 9$\alpha$-fluoro-16-methyleneprednisolone or -prednisone can be converted into any desired esters by esterification or interesterification. Useful as esterification or interesterification agents are all those acids or functional derivatives thereof suitable for esterification which result in physiologically compatible esters. For example, the following acids, or the derivatives thereof suitable for esterification, can be employed: carboxylic acids, e.g. fatty acids of preferably 1—18 carbon atoms, such as acetic acid, propionic acid, butyric acid, valeric acid, isovaleric acid, trimethylacetic acid, caproic acid, tert.—butylacetic acid, enanthic acid, caprylic acid, palmitic acid, stearic acid; undecylenic acid, benzoic acid, hexahydrobenzoic acid, cyclopentyl—, cyclohexyl—or arylacetic and —propionic acids, such as phenylacetic acid or phenylpropionic acid, as well as halocarboxylic acids, such as chloroacetic acid, ether acids or heterocyclic acids, such as furancarboxylic acid—(2) or nicotinic acid.

Optionally, it is also possible to conduct the esterification with dicarboxylic acids of preferably 2—18 carbon atoms, amino— or alkylamino carboxylic acids, or with phosphoric or sulfuric acid, in order to produce water-soluble derivatives, such as: oxalates, succinates, maleates, tetrahydrophthalates or the acid addition salts of amino-carboxylic acid esters, such as, for example, aspartic acid esters or diethylaminoacetic acid esters. Functional acid derivatives suitable for esterification, in addition to the free acids, include, but are not limited to, acyl halides, anhydrides, thio derivatives and ketenes. For interesterification methods, lower alkyl esters are also suitable.

The 16-methylenecorticoids obtained by the process of this invention are utilized as anti-inflammatory drugs. They are especially efficacious in the treatment of rheumatoid arthritis, and for combating chronic allergies and other inflammatory diseases of the skin.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. Epoxide Splitting with HF

One gram of 9$\beta$, 11$\beta$; 16$\alpha$, 17$\alpha$-diepoxy-16$\beta$-methyl-progesterone is introduced in incremental portions under stirring into 3 ml. of 70 percent hydrofluoric acid at −15° C. within 15 minutes. The mixture is additionally agitated for 2 hours at −15° to −20° C. and then stirred into a mixture of 7 g. of potassium carbonate, 50 ml. of water and 50 g. of ice. The thus-precipitated 9$\alpha$-fluoro-11$\beta$, 17$\alpha$-dihydroxy-16-methyleneprogesterone is vacuum-filtered, washed with water, dried, and recrystallized from ether; m.p. 253°—255° C.

b. Microbiological 1(2)-Dehydrogenation

A culture of Corynebacterium simplex bred in a conventional manner in a fermentation vessel of 100 liters capacity receives at a pH of 6.7 — 7.0 an addition of 30 g. of 9$\alpha$-fluoro-11$\beta$, 17$\alpha$-dihydroxy-16-methyleneprogesterone in 950 ml. of methanol. After an agitation period of 7 — 8 hours, the reaction is terminated. The liquor is extracted 5 times with respectively 20 l. of dichloromethane. The combined extracts are concentrated by evaporation, and the residue is mixed with 600 ml. of petroleum ether. After allowing the mixture to stand overnight, the undissolved substance is vacuum-filtered, washed with petroleum ether, dried, and recrystallized from acetone. 9$\alpha$-

Fluoro-11β, 17α-dihydroxy-16-methylene-1,4-pregnadiene-3,20-dione is obtained, having the melting point of 295°—296° C.

c. Acetoxylation 58 g. of 9α-fluoro-11β, 17α-dihydroxy-16-methylene-1,4-pregnadiene-3,20-dione is suspended in a mixture of 870 ml. of tetrahydrofuran and 522 ml. of methanol. Under agitation, 87 g. of calcium oxide and 87 g. of iodine are introduced in small portions within the course of 2 hours. Thereafter, the reaction mixture is additionally stirred for 1 hour and then introduced into a mixture of 18 l. of water, 6 kg. of ice and 290 ml. of glacial acetic acid. The precipitate is washed with water, dried at room temperature, and dissolved in 4,750 ml. of acetone. After adding 285 g. of potassium acetate, the reaction mixture is boiled for 6 hours under reflux and then concentrated by evaporation. The residue is worked up in a conventional manner and recrystallized from chloroform, thus obtaining 9α-fluoro-16-methylene-prednisolone-21-acetate, m.p. 233°—234° C.; $[\alpha]_D^{20} + 32°$ (dioxane).

d. Saponification

One gram of 9α-fluoro-16-methyleneprednisolone-21-acetate is dissolved in 50 ml. of methanol saturated with nitrogen and mixed, with the introduction of nitrogen, with 2 ml. of 10 percent potassium carbonate solution saturated with nitrogen. The mixture is stirred for 30 minutes at room temperature, neutralized with 1.7 ml. of glacial acetic acid, diluted with water and extracted with chloroform. After conducting the usual working-up process and concentrating the extract by evaporation, 9α-fluoro-16-methyleneprednisolone is obtained, m.p. 241°—243° C. (from ethanol); $[\alpha]_D^{20}+26.6°$ (dioxane).

(e) Oxidation.

2.5 g. of 9α-fluoro-16-methyleneprednisolone-21-acetate is dissolved in 25 ml. of pyridine and added to a mixture of 2.5 g. of chromic acid anhydride and 25 ml. of pyridine. After 12 hours, the reaction mixture is poured into 250 ml. of ethyl acetate and refluxed under boiling for 5 minutes. The precipitate is vacuum-filtered and thoroughly washed with hot ethyl acetate. The filtrates are washed neutral with dilute sulfuric acid, dried and concentrated by evaporation. The residue of crude 9α-fluoro-16-methyleneprednisone-21-acetate is obtained in the pure form by recrystallization from methanol or ethyl acetate; m.p. 242°—243° C.; $[\alpha]_D^{20} +103.8°$ (dioxane).

Analogously, by oxidizing 9α-fluoro-16-methyleneprednisolone, 9α-fluoro-16-methyleneprednisone is obtained, m.p. 241°-243° C.; $[\alpha]_D^{20} + 86.1°$ (dioxane).

f. Esterification

One gram of 9α-fluoro-16-methyleneprednisolone is dissolved in 10 ml. of pyridine and mixed with 10 ml. of tert.-butyl acetyl chloride. After allowing the reaction mixture to stand for 1 ½ hours at room temperature, it is poured into 100 ml. of water; the thus-precipitated 9α-fluoro-16-methyleneprednisolone-21-tert.-butyl acetate is vacuum-filtered, washed with water, dried and recrystallized from acetone/ether; m.p. 231°—232° C; $[\alpha]_D^{20}+20°$ (chloroform.)

Analogously, the following esters of 9α-fluoro-16-methylene-prednisolone are obtainable:

21-chloroacetate, m.p. 242°—234° C.; $[\alpha]_D^{20} + 17$ (dioxane);

21-trimethylacetate, m.p. 234°—235° C.;

21-diethylaminoacetate, m.p. 216°—217° C.; $[\alpha]_D^{20} + 26.6°$ (dioxane);

21-enanthate, m.p. 231°—232° C.; $[\alpha]_D^{20} + 4.5°$ (chloroform).

The starting material is obtained as follows:

a. Microbiological 11α-Hydroxylation.

In a fermentation vessel, 45 l. of a sterile nutritive solution is inoculated with 5 l. of a submerged culture of Aspergillus sp. (E. Merck No. 2314) having an age of 24 hours. The nutritive solution contains:

1.0 % of glucose 1.0 % of malt extract 0.5 % of yeast extract 0.1 % of $NaNO_3$ 0.1 % of $(NH_4)_2HPO_4$ 0.2 % of $KH_2PO_4$ 0.05 % of $MgSO_4$ in completely desalted water.

The fungus culture grows at 28° C. under agitation and aeration. After 24 hours, 25 g. of 16β-methyl-16α,17α-epoxy-progesterone in 500 ml. of methanol is added thereto. The reaction is observed by thin-layer chromatography. Twenty-four hours after this addition, no starting material can be detected any more; the chromatogram shows only 11α-hydroxy-16β-methyl-16α,17α-epoxyprogesterone and insignificant traces of by-products. The fungal mycelium is removed by centrifuging, and the clear solution is stirred out eight times with respectively 25 liters of dichloromethane. The combined extracts are concentrated by evaporation; the residue is treated with petroleum ether. The thus-obtained crude 11α-hydroxy-16β-methyl-16α, 17α-epoxyprogesterone is vacuum-filtered, washed with petroleum ether and leached by boiling with ether; m.p. 208°—209° C.

b. Tosylation.

14 g. of 11α-hydroxy-16β-methyl-16α, 17α-epoxy-progesterone is dissolved in 250 ml. of absolute pyridine. 25 g. of p-toluenesulfonic acid chloride is added to the solution, and the latter is allowed to stand overnight at 50° C., then stirred into approximately 3 l. of water, and the thus-crystallized product is vacuum-filtered and dried.

c. Formation of the 9(11)-Double Bond.

12.4 g. of crude 11α-p-tosyloxy-16β-methyl-16α, 17α-epoxyprogesterone is dissolved in 500 ml. of absolute ethanol. 37.5 g. of potassium acetate is added to the solution; the mixture is boiled for 22 hours, concentrated to half its previous volume, and stirred into about 3 l. of water. The thus-crystallized 9(11)-dehydro-16β-methyl-16α, 17α-epoxyprogesterone is vacuum filtered, washed with water, dried and recrystallized from ether; m.p. 162°—164 °C.

d. Chemical Addition of Hypobromous Acid.

2.7 g. of 9,11-dehydro-16β-methyl-16α, 17α-epoxyprogesterone is suspended in 81 ml. of acetone and 28 ml. of water. 1.1 ml. of 70 percent perchloric acid is added to the suspension, and 2.16 g. of N-bromosuccinimide is added in incremental portions, the temperature being maintained at +10° C. After 1 ½ hours, the solution is stirred into 1 l. of water, and the thus precipitated 9α-bromo-11β-hydroxy-16β-methyl-16α, 17α-epoxyprogesterone is vacuum-filtered and dried.

e. Dehydrobromination.

3.5 g. of 9α-bromo-11β-hydroxy-16β-methyl-16α, 17α-epoxyprogesterone is dissolved in 140 ml. of absolute ethanol. 10.5 g. of potassium acetate (anhydrous) is added to the solution, and the latter is boiled for 2 hours, cooled, and stirred into 600 ml. of water. The thus-crystallized 9β, 11β-epoxy-16β-methyl-16α, 17α-epoxy-progesterone is vacuum-filtered, washed with water, dried and recrystallized from ether; m.p. 153°—156° C.

EXAMPLE 2 a. Microbiological 1(2)-Dehydrogenation.

Analogously to Example 1(b), there is obtained from 9β, 11β; 16α, 17α-diepoxy-16β-methylprogesterone, the compound 9β, 11β; 16α, 17α-diepoxy-16β-methyl-1,4-pregnadiene-3,20-dione, m.p. 205°—206° C.

EXAMPLE 3

Epoxide Splitting with HF

In analogy to Example 1(a), the following compounds

9β,11β; 16α,17α-diepoxy-16β-methyl-4-pregnene-21ol-3,20-dione

9β,11β;16α,17α-diepoxy-16β-methyl-4-pregnene-21-ol-3,20-dione 21-acetate

6α-fluoro-9β,11β;16α,17α-diepoxy-16β-methyl-4-pregnene-21-ol-3,20-dione 21-acetate 6α,16β-dimethyl-9β,11β;16α,17α-diepoxy-4-pregnene-21-ol-3,20-dione 21-acetate 9β,11β;16α,17α-diepoxy-16β-methyl-4,6-pregnadiene-21-ol-3,20-dione 21-acetate 6-fluoro-9β,11β16α,17α-diepoxy-16β-methyl-4,6-pregnadiene-21-ol-3,20-dione 21-acetate 6-chloro-9β,11β;16α,17-diepoxy-16β-methyl-4,6-pregnadiene 21-ol-3,20-dione 21-acetate 6-bromo-9β,11β;16α,17-diepoxy-16β-methyl-4,6-pregnadiene 21-ol-3,20-dione 21-acetate 6,16β-dimethyl-9β,11β;16α,17α-diepoxy-4,6-pregnadiene-21-ol-3,20-dione 21-acetate 9β,11β;16α,17α-diepoxy-16β-methyl-1,4-pregnadiene-21-ol-3,20-dione 9β,11β;16α,17α-diepoxy-16β-methyl-1,4-pregnadiene-21-ol-3,20-dione 21-acetate 6α,16β-dimethyl-9β,11β;16α,17α-diepoxy-1,4-pregnadiene-21-ol-3,20-dione 21 acetate 6β,16β-dimethyl-9β,11β;16α,17α-diepoxy-1,4-pregnadiene-21 ol-3,20-dione 21-acetate 6α-fluoro-9β,11β;16α,17α-diepoxy -16β-methyl-1,4-pregnadiene-21-ol-3,20-dione 21-acetate 6β-fluoro-9β,11β;16α,17α-diepoxy-16β-methyl-1,4-pregnadiene-21-ol-3,20-dione 21-acetate 9β,11β,16α,17α-diepoxy-16β-methyl-1,4,6-pregnatriene-21-ol-3,20-dione 21-acetate 6,16β-dimethyl-9β,11β;16α,17α-diepoxy-1,4,6-pregnatriene-21-ol-3,20-dione 21-acetate 6-fluoro-9β,11β;16α,17-diepoxy-16β-methyl-1,4,6-pregnatriene-21-ol-3,20-dione 21-acetate 9β,11β;16α,17α-diepoxy-16β-fluoromethyl-progesterone 9β,11β;16α,17α-diepoxy-16β-fluoromethyl-4-pregnene-21-ol-3,20-dione 21-acetate 6α-fluoro-9β,11β;16α,17α-diepoxy-16β-fluoromethyl-4-pregnene-21-ol-3,20-dione 21-acetate 6α-methyl-9β,11β;16α,17α-diepoxy-16β-fluoromethyl-4-pregnene-21-ol-3,20-dione 21-acetate 9β,11β;16α,17α-diepoxy-16β-fluoromethyl-4,6-pregnadiene-3,20-dione 9β,11β;16α,17α-diepoxy-16β-fluoromethyl-4,6-pregnadiene-21-ol-3,20-dione 6-fluoro-9β,11β;16α,17-diepoxy-16β-fluoromethyl-4,6-pregnadiene-21-ol-3,20-dione 21-acetate 6-methyl-9β,11β;16α,17α-diepoxy-16β-fluoromethyl-4,6-pregnadiene-21-ol-3,20-dione 21-acetate 9β,11β,16α,17α-diepoxy-16β-fluoromethyl-1,4-pregnadiene-3,20-dione 9β,11β;16α,17α-diepoxy-16β-fluoromethyl-1,4-pregnadiene-21-ol-3,20-dione 9β,11β;16α,17α-diepoxy-16β-fluoromethyl-1,4-pregnadiene-21-ol-3,20-dione 21-oenanthate 6α-methyl-9β,11β;16α,17α-diepoxy-16β-fluoromethyl-1,4-pregnadiene-21-ol-3,20-dione 21-acetate 6β-methyl-9β,11β;16α,17α-diepoxy-16β-fluoromethyl-1,4-pregnadiene-21-ol-3,20-dione -b 21-acetate 6α-fluoro-9β,11β;16α,17α-diepoxy-16β-fluoromethyl-1,4-pregnadiene-21-ol-3,20-dione 21-acetate 6β-fluoro-9β,11β;16α,17α-diepoxy-16β-fluoromethyl-1,4-pregnadiene-21-ol-3,20-dione 21-acetate 6-methyl-9β,11β;16α,17-diepoxy-16β-fluoromethyl-1,4,6-pregnatriene-21ol-3,20-dione 21-acetate
6-fluoro-9β,11β;16α,17-diepoxy-16β-fluoromethyl-1,4,6-pregnatriene-21-ol-3,20-dione 21-acetate
are reacted with hydrogen fluoride to yield
9α-fluoro-16-methylene-cortisol
9α-fluoro-16-methylene-cortisol 21-acetate
6α,9α-difluoro-16-methylene-cortisol 21-acetate
6α-methyl-9α-fluoro-16-methylene-cortisol 21-acetate
9α-fluoro-6-dehydro-16-methylene-cortisol 21-acetate
6,9α-difluoro-6-dehydro-16-methylene-cortisol 21-acetate
6-chloro-9α-fluoro-6-dehydro-16-methylene-cortisol 21-acetate
6-bromo-9α-fluoro-6-dehydro-16-methylene-cortisol 21-acetate
6-methyl-9α-fluoro-6-dehydro-16-methylene-cortisol 21-acetate
9α-fluoro-16-methylene-prednisolone
9α-fluoro-16-methylene-prednisolone 21-acetate
6α-methyl-9α-fluoro-16-methylene-prednisolone 21-acetate
6β-methyl-9α-fluoro-16-methylene-prednisolone 21-acetate
6α,9α-difluoror-16-methylene-prednisolone 21-acetate
6β,9α-difluoro-16-methylene-prednisolone 21-acetate
9α-fluoro-6-dehydro-16-methylene-prednisolone 21-acetate
6-methyl-9α-fluoro-6-dehydro-16-methylene-prednisolone 21-acetate
6,9α-difluoro-6-dehydro-16-methylene-prednisolone 21-acetate
9α-fluoro-11β,17α-dihydroxy-16-fluoromethylene-progesterone
9α-fluoro-16-fluoromethylene-cortisol-21-acetate
6α,9α-difluoro-16-fluoromethylene-cortisol 21-acetate
6α-methyl-9α-fluoro-16-fluoromethylene-cortisol 21-acetate
9α-fluoro-11β,17α-dihydroxy-16-fluoromethylene-4,6-pregnadiene-3,20-dione
9α-fluoro-6-dehydro-16-fluoromethylene-cortisol
6,9α-difluoro-6-dehydro-16-fluoromethylene-cortisol 21-acetate
6-methyl-9α-fluoro-6-dehydro-16-fluoromethylene-cortisol 21-acetate
9α-fluoro-11β,17α-dihydroxy-16-fluoromethylene-1,4-pregnadiene-3,20-dione
9α-fluoro-16-fluoromethylene-prednisolone
9α-fluoro-16-fluoromethylene-prednisolone 21-oenanthate
6α-methyl-9α-fluoro-16-fluoromethylene-prednisolone 21-acetate
6β-methyl-9α-fluoro-16-fluoromethylene-prednisolone 21-acetate
6α,9α-difluoro-16-fluoromethylene-prednisolone 21-acetate
6β,9α-difluoro-16-fluoromethylene-prednisolone 21-acetate
6-methyl-6-dehydro-16-fluoromethylene-prednisolone 21-acetate
6-fluoro-6-dehydro-16-fluoromethylene-prednisolone 21-acetate The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a member selected from the group consisting of:
A. 9α-fluoro-16-methyleneprednisolone;
B. 9α-fluoro-16-methyleneprednisone;
C. a 21-ester of (A); and
D. a 21-ester of (B);
the step of reacting at −15° to −20°C. approximately 70 percent by weight aqueous hydrogen fluoride with a reactant selected from the group consisting of:
9β, 11β;, 16α, 17α-diepoxy-16β-methyl-progesterone and the 1(2)-dehydro derivative thereof, said reaction being conducted for 15 minutes to 6 hours.

* * * * *